(12) United States Patent  
Shitano et al.

(10) Patent No.: US 7,586,860 B2  
(45) Date of Patent: Sep. 8, 2009

(54) COMMUNICATION APPARATUS, COMMAND TRANSMISSION METHOD, AND PROGRAM FOR NETWORKED DEVICES USING DIFFERENT PROTOCOLS

(75) Inventors: Masaki Shitano, Kanagawa-ken (JP); Kenichi Fujii, Kanagawa-ken (JP); Takashi Hirata, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 333 days.

(21) Appl. No.: 11/449,623

(22) Filed: Jun. 9, 2006

(65) Prior Publication Data

US 2007/0002867 A1 Jan. 4, 2007

(30) Foreign Application Priority Data

Jun. 16, 2005 (JP) ............................. 2005-176891

(51) Int. Cl.
*H04J 1/16* (2006.01)
*H04L 12/56* (2006.01)
(52) U.S. Cl. ...................... 370/282; 370/466; 710/19
(58) Field of Classification Search ................. 370/466, 370/467, 282; 710/19
See application file for complete search history.

(56) References Cited

U.S. PATENT DOCUMENTS

| 6,157,465 | A | 12/2000 | Suda et al. ................. 358/407 |
| 6,477,570 | B1 | 11/2002 | Takayama et al. ........... 709/224 |
| 6,718,402 | B1* | 4/2004 | Arroyo ........................ 710/19 |
| 7,006,494 | B1* | 2/2006 | Tighe et al. ................. 370/389 |
| 2005/0060419 | A1 | 3/2005 | Fujii et al. .................. 709/230 |
| 2005/0066197 | A1 | 3/2005 | Hirata et al. ................ 713/201 |
| 2006/0200564 | A1 | 9/2006 | Watanabe et al. ........... 709/227 |
| 2006/0206592 | A1 | 9/2006 | Fujii et al. .................. 709/220 |
| 2006/0242304 | A1 | 10/2006 | Hirose et al. ................ 709/227 |
| 2006/0246946 | A1 | 11/2006 | Moritomo et al. ........... 455/557 |
| 2006/0246947 | A1 | 11/2006 | Fujii et al. .................. 455/557 |
| 2006/0268744 | A1 | 11/2006 | Sakai et al. ................. 370/254 |
| 2007/0041357 | A1 | 2/2007 | Hoffmann et al. ........... 370/352 |

FOREIGN PATENT DOCUMENTS

JP 08-097878 4/2006
WO WO 2005/027487 A1 3/2005

\* cited by examiner

*Primary Examiner*—John Pezzlo
(74) *Attorney, Agent, or Firm*—Fitzpatrick, Cella, Harper & Scinto (57) ABSTRACT

The communication apparatus obtains through a first protocol a status of a first device connected to the communication apparatus via a network, and receives a message of a second protocol between the first device and a second device that are connected to each other via the network. Then, the communication apparatus generates and transmits a command of the second protocol to the second device, in accordance with the statuses of the first device obtained before and after the reception of the message.

8 Claims, 8 Drawing Sheets

| IP Address | Message | beforeStat 503 | afterStat 504 | existingCommand 505 |
|---|---|---|---|---|
| 510 — 192.168.0.11 | POST /control HTTP/1.1<br>HOST:192.168.0.11<br>SAOPACTION:"urn:schemas:upnp-org:service:Print Basic:2#create Job"<br><soap:Envelope<br>xmlns:soap="http://schemas.xmlsoap.org/soap/envelope/"xmlns:xsi="http://www.w3.org/2001/XMLSchema-instance"<br>xmlns:xsd="http://www.w3.org/2001/XMLSchema"><br><soap:Header><br></soap:Header><br><soap:Body><br><Print xmlns="http://tempuri.org/"><br><input>ppp.txt</input><br></Print><br></soap:Body><br></soap:Envelope> | idle | processing | Print |
| 511 — 192.168.0.20 | POST /control HTTP/1.1<br>HOST:192.168.0.20<br>SAOPACTION:"urn:schemas:abcde.com:scaning#scan"<br><soap:Envelope<br>xmlns:soap="http://schemas.xmlsoap.org/soap/envelope/"xmlns:xsi="http://www.w3.org/2001/XMLSchema-instance"<br>xmlns:xsd="http://www.w3.org/2001/XMLSchema"><br><soap:Header><br></soap:Header><br><soap:Body><br><scaning xmlns="http://tempuri.org/"/><br></scaning><br></soap:Body><br></soap:Envelope> | idle | processing | scan |
| 512 — 192.168.0.12 | POST /control HTTP/1.1<br>HOST:192.168.0.12<br>SAOPACTION:"urn:abcde.com:light#Power On"<br><soap:Envelope<br>xmlns:soap="http://schemas.xmlsoap.org/soap/envelope/"xmlns:xsi="http://www.w3.org/2001/XMLSchema-instance"<br>xmlns:xsd="http://www.w3.org/2001/XMLSchema"><br><soap:Header><br></soap:Header><br><soap:Body><br><Power On xmlns="http://tempuri.org/"/><br></Power On><br></soap:Body><br></soap:Envelope> | off | on | lightOn |

COMMUNICATION APPARATUS, COMMAND TRANSMISSION METHOD, AND PROGRAM FOR NETWORKED DEVICES USING DIFFERENT PROTOCOLS

FIELD OF THE INVENTION

The present invention relates to a communication apparatus and a command transmission method and program.

BACKGROUND OF THE INVENTION

Many protocols for use in communications exist in various configurations and layers. For example, hierarchical protocol model has been standardized as the seven-layer OSI reference model by the International Organization for Standardization (ISO), the International Telecommunication Union (ITU) and the like. Protocols can be classified according to this model. IP, presently the standard for the Internet, is a third layer (network layer) protocol; TCP and UDP are fourth layer (transport layer) protocols; HTTP, FTP, SMTP, POP and the like are fifth (session layer) or higher layer (session layer) protocols. Further, integrated protocols also exist including UPnP used in network devices and home electric products. It has become a common practice to mount these communication protocols on network devices and home electric products and thereby secure interoperability between each node.

As described above, however, various communication protocols exist, and standards, specifications and objects different from each other exist. Further, it is a fact that there are several kinds of different protocols to achieve the same object.

Therefore, upon purchasing a network device or a home electric product, a user must select a product having mounted thereon the same protocol. Further, even when a product having mounted thereon the same protocol is selected, it may be impossible to secure interoperability between these devices or between these products due to version-up of the protocol itself, appearance of a new protocol mounted on a new product, or the like.

To address such problem, Japanese Patent Laid-Open No. 8-97878 discloses a technique for performing communication between nodes on a network employing different protocols. In this document, there is disclosed a technique which associates information on which kind of protocol a node (device) on the network uses, with the address of the device and the kind of protocol, and stores the information, and based on the stored information, selects a protocol for each device and thereby performs communication. In order to implement this, several kinds of protocols must be preliminarily mounted on each device. In each device, there is a limitation on the number of mountable protocols, and thus it is practically impossible to mount all existing protocols. Further, with such technique, it is impossible to cope with protocols not mounted and unknown protocols.

As described above, in a case where network devices and home electric products using different protocols are used, or even in a case that the same protocol is used, interoperability cannot be secured between network devices and home electric products due to the difference of version.

Further, the technique described in the above document relates to a coping method employed typically before product shipment, and no method after product shipment is considered at all. To apply the technique described in the above document to products after shipment, a processing must be conducted such as allowing the user to update the firmware of the product or recalling the product to rewrite the program of the product, which is not practical.

SUMMARY OF THE INVENTION

An object of the present invention is to solve the above drawback of conventional art.

Further, the feature of the present invention is provide a technique in which a device, such as a network device or a home electric product, connected to a network can cope with unknown protocols without updating the firmware of the device.

According to the present invention, there is provided with a communication apparatus, comprising:

obtaining means for obtaining a status of a first device through a first protocol, wherein the first device is connected to the communication apparatus via a network;

reception means for receiving a message of a second protocol between the first device and a second device that are connected each other via the network; and transmission means for transmitting a command of the second protocol to the second device, in accordance with the statuses of the first device obtained by the obtaining means before and after the reception of the message by the reception means.

Further, according to the present invention, there is provided with a command transmission method in a communication apparatus, comprising:

an obtaining step of obtaining through a first protocol a status of a first device connected to the communication apparatus via a network;

a reception step of receiving a message of a second protocol between the first device and a second device that are connected to each other via the network; and a transmission step of transmitting a command of the second protocol to the second device, in accordance with the statuses of the first device obtained in the obtaining step before and after the reception of the message in the reception step.

This summary of the invention does not enumerate all necessary characteristics. Thus, sub-combinations of a group of these characteristics could be inventions.

Other features, objects and advantages of the present invention will be apparent from the following description when taken in conjunction with the accompanying drawings, in which like references designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

A preferred embodiment of the present invention will be described below in detail with reference to the accompanying drawings. It should be noted that the embodiment described below does not limit the scope of the invention defined by the claims, and all the combinations of features described in the embodiment are not necessarily essential for the invention to solve the problem.

Figure 1:
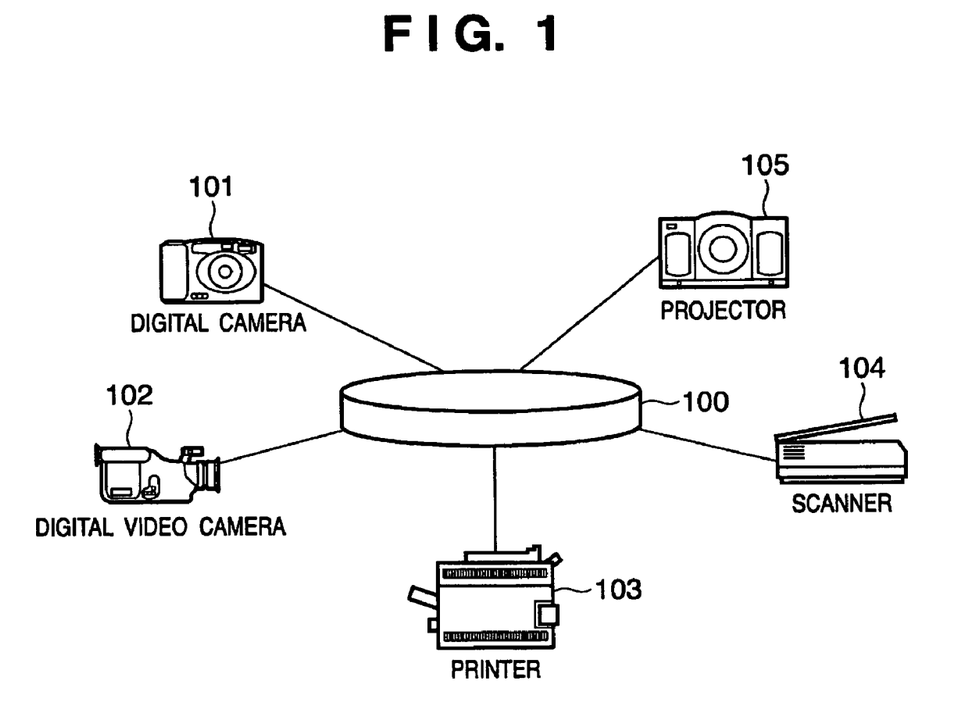
FIG. 1 depicts a view for explaining the overall configuration of a communication system according to an embodiment of the present invention.

FIG. 1 depicts a view for explaining the overall configuration of a communication system according to an embodiment of the present invention.

In this communication system, connected to a network 100 are a digital camera 101, a digital video camera 102, a printer 103, a scanner 104 and a projector 105. In the present embodiment, a case where these devices are connected to the network 100 is described, but the present invention is not limited thereto.

The above devices each have sources required to execute programs mounted on each device, the sources including an arithmetic function (MPU, program memory and the like) and a data holding function (memory and the like). Each of the devices further has a control function of controlling the device itself and a communication function for communicating with other devices via the network 100, and a protocol learning control function described later. It is noted here that a case will be described where these various functions are implemented based on the control performed by a main processing unit (MPU), which is executed according to programs stored in the memory.

Figure 2:
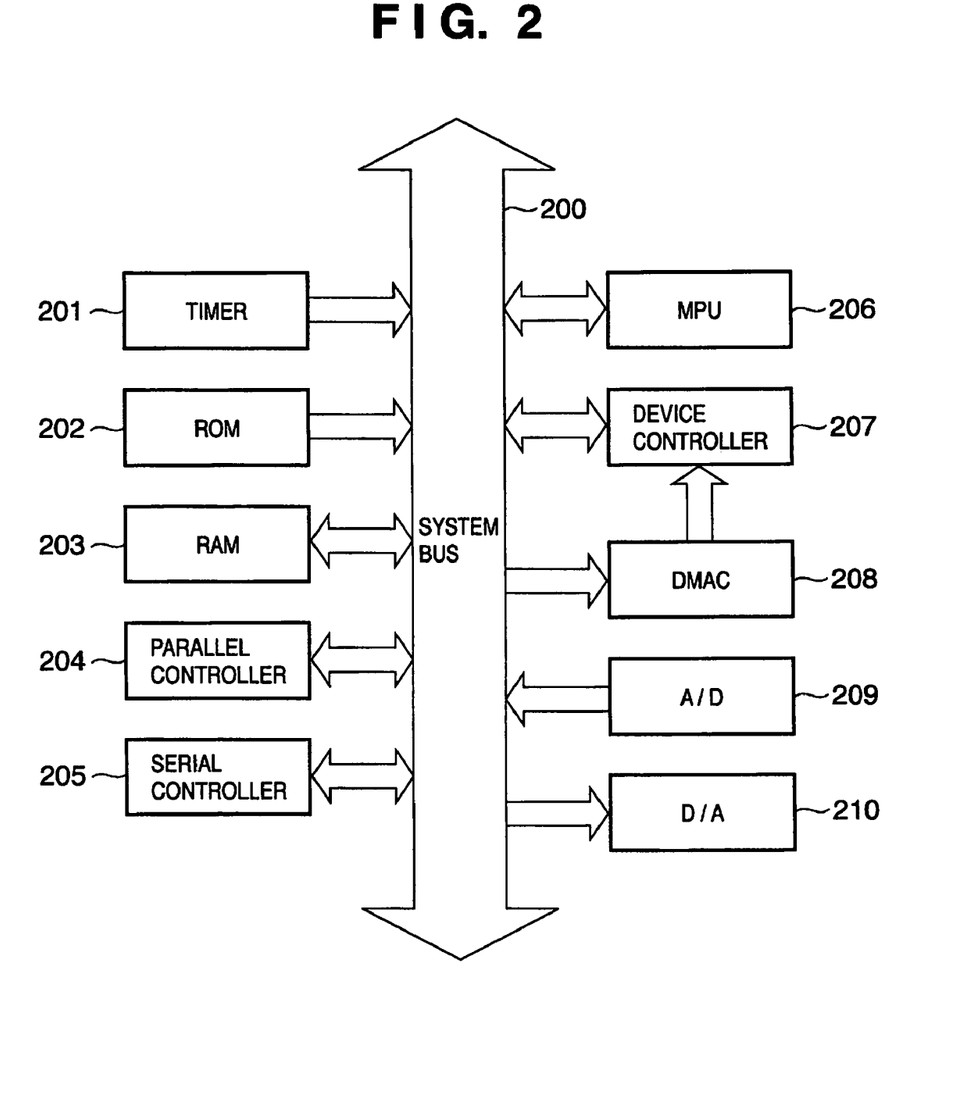
FIG. 2 is a block diagram showing a hardware configuration of a controller of each device according to the embodiment of the present invention.

FIG. 2 is a block diagram showing a hardware configuration of a controller of each of the above described devices according to the embodiment of the present invention. In addition to the configuration shown in FIG. 2, each device, such as the camera, printer and scanner, includes respective functions, in order to realize functions such as the camera or the printer. For example, the printer includes a printer engine, the camera includes a lens unit and the image processing unit includes an operation unit, etc. An explanation of configurations for implementing these functions is omitted here.

Reference numeral 200 denotes an input/output bus (address bus, data bus and control bus) for performing connection between each unit. A timer 201 performs a time counting operation based on an instruction from an MPU 206, and allows an interrupt to be generated at a specified time interval. The timer has a so-called watchdog timer function and a time counting function. A ROM 202 stores programs codes executed by the MPU 206 and unchanged fixed data. A RAM 203 being a main memory provides a work area when the programs are executed. A parallel I/O controller 204 serves to directly input/output parallel data handled by the MPU 206 to external devices. A serial I/O controller 205 serves to output parallel data handled by the MPU 206 after converting it into serial data, or convert received serial data into parallel data. The MPU 206 sequentially executes program instructions and at the same time executes an interrupt control and the like.

A device controller 207 is connected to general external input/output devices such as a hard disk and a display (display unit), and controls these devices. DMAC 208 is a DMA controller, and controls DMA data transfer between the memory and external devices. An A/D converter 209 receives an analog signal and converts it into digital data. Here, an analog signal sensed by a sensor or the like is received and digitized. A D/A converter 210 converts digital data into an analog signal, and the converted signal is used to control the operation of an external actuator or the like.

Figure 3:
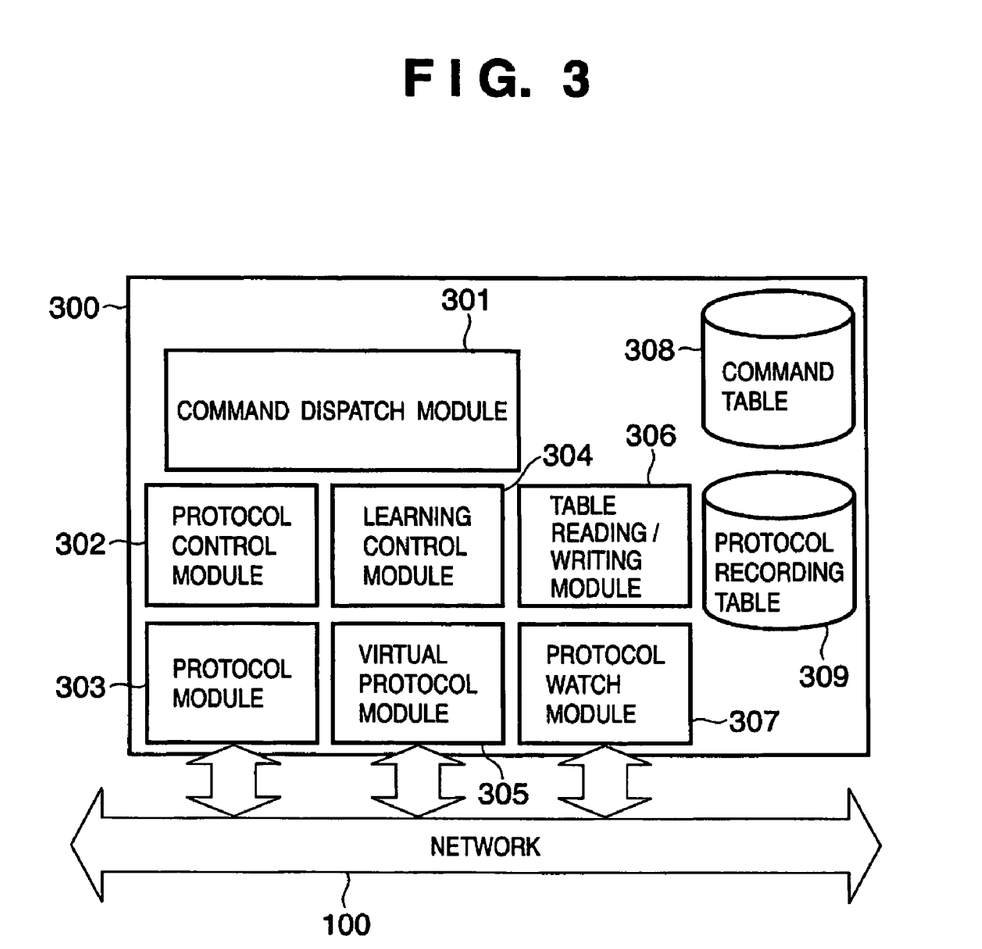
FIG. 3 is a block diagram showing a module configuration of a protocol learning control function according to the embodiment.

FIG. 3 is a block diagram showing a module configuration of a protocol learning control function 300 according to the present embodiment.

The protocol learning control function 300 is mounted on the devices such as the above described digital camera 101, projector 102, scanner 103, printer 104 and digital video camera 105. Here, the protocol learning control function 300 is implemented by the MPU 206 and the program stored in ROM 202.

The protocol learning control function 300 includes a command dispatch module 301, a protocol control module 302, a protocol module 303, a learning control module 304, a virtual protocol module 305, a table reading/writing module 306, a protocol watch module 307, a command table 308 and a protocol recording table 309. Each of the modules will be described below in detail.

The command dispatch module 301 accepts a request from an application (stored in the ROM 202) mounted on a device such as the above described digital camera 101 or projector 102 and the like. Then, the command dispatch module 301 performs selection between activation of an existing protocol mounted before product shipment and activation of a new virtual protocol obtained through learning. The command dispatch module 301 accesses the command table 308 described later and thereby determines whether an existing or new virtual protocol is to be selected. Further, the command dispatch module 301 also has a function of calling based on the above determination result any one of the protocol control module 302 described later and the learning control module 304 described later.

The protocol control module 302 controls the protocol module 303 described later. Further, the protocol control module 302 also has a function of accepting a request from the learning control module 304, and a function of transferring the result.

The protocol module 303 has mounted thereon device control protocols such as UPnP (Universal Plug and Play), Jini and Jxta, and has the functions of each protocol. Here, protocols preliminarily mounted before product shipment are assumed, but the present invention is not limited to these protocols.

The learning control module 304 accepts a request from the command dispatch module 301, and controls the virtual protocol module 305 described later. Further, the learning control module 304 has a function of issuing a request to the protocol control module 302, a function of controlling the protocol watch module 307 to start or stop watching of network message etc., and a function of receiving a message from the protocol watch module 307. The learning control module 304 controls the table reading/writing module 306 described later and transfers messages. In response to an instruction from the learning control module 304, the virtual protocol module 305 transmits a message to another device via the network 100 and receives a message from another device.

In response to an instruction from the learning control module 304, the table reading/writing module 306 instructs the command table 308 and protocol recording table 309 described later to read/write data, and transfers data based on these instructions.

In response to an instruction from the learning control module 304, the protocol watch module 307 watches messages flowing through the network 100 and obtains the messages. Further, the protocol watch module 307 also has a function of transferring this same message to the learning control module 304. The command table 308 is a database for permanently storing data described later with the data retrievable; the contents of the database can be retrieved, read/written, added or deleted. The protocol recording table 309 is a database for permanently storing data described later with the data retrievable; the contents of the database can be retrieved, read/written, added or deleted.

Figure 4:
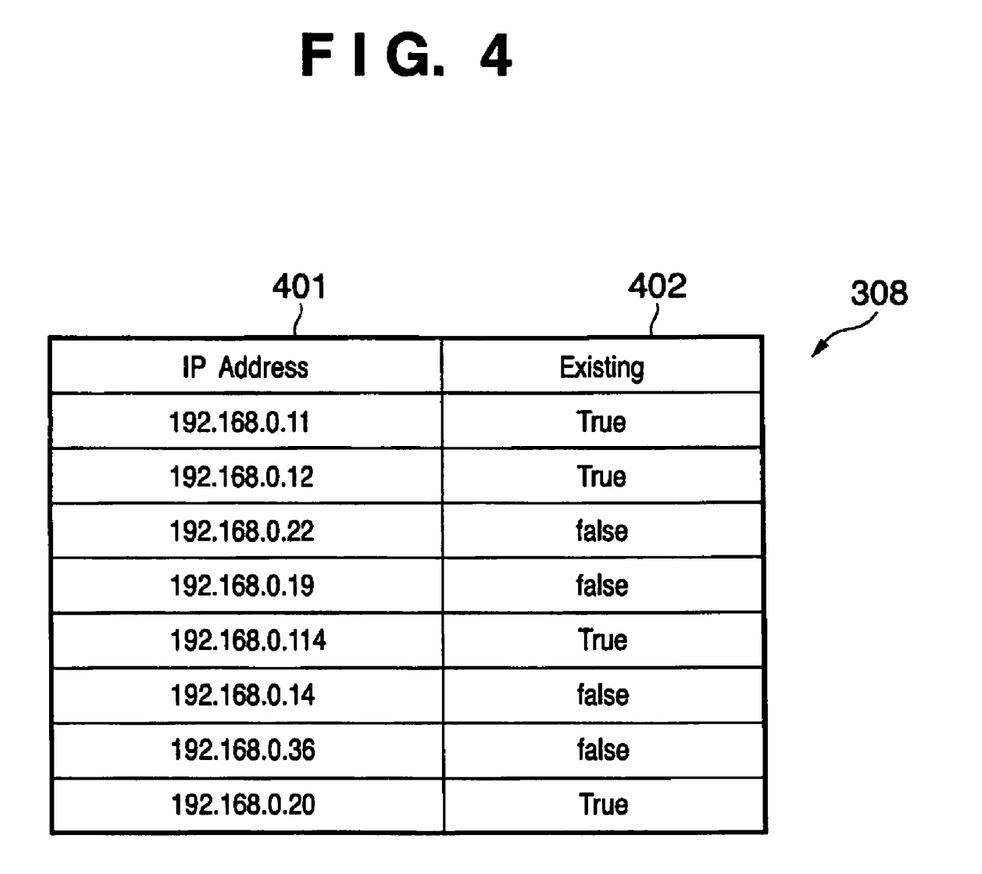
FIG. 4 depicts a view showing an example of command table according to the embodiment.

FIG. 4 depicts a view showing an example of the command table 308 according to the present embodiment.

The command table 308 has an IP Address column 401 and an Existing column 402. With respect to each column, retrieve, read/write, addition and deletion are possible. Here, the content of the Existing column 402 is uniquely specified for each content of the IP Address column 401. Stored in the IP address column 401 is the IP address of a device connected to the network 100. Stored in the Existing column 402 is a character string "True" (indicating that an existing protocol is mounted) or a character string "false" (indicating that an existing protocol is not mounted). The purpose of use of "True" or "false" in the Existing column 402 is described later.

Figure 5:
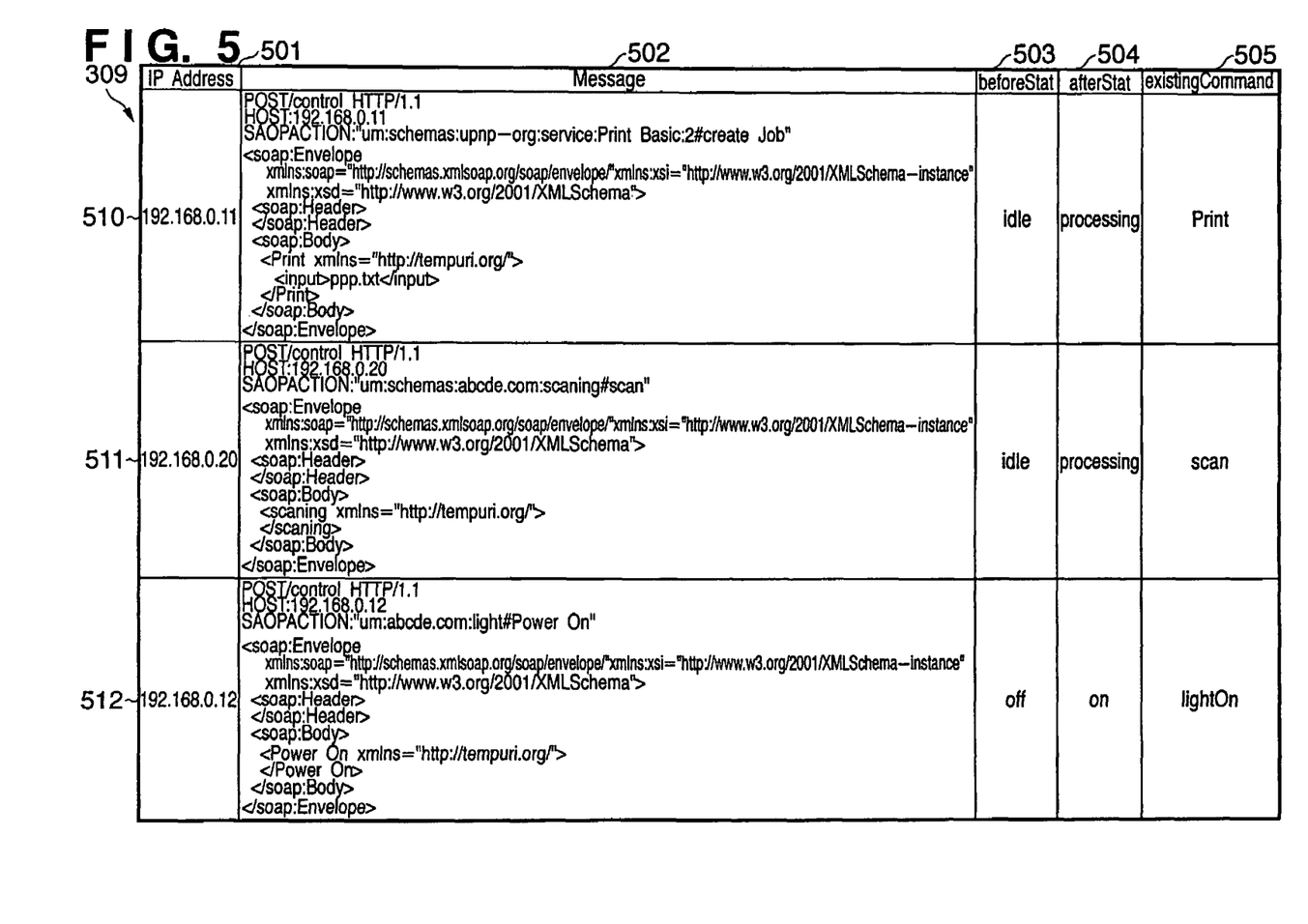
FIG. 5 depicts a view showing an example of protocol recording table according to the embodiment.

FIG. 5 depicts a view showing an example of the protocol recording table 309 according to the present embodiment.

The protocol recording table 309 has an IP Address column 501, a Message column 502, a beforeStat column 503, an afterStat column 504 and an existingCommand column 505. With respect to each column, retrieve, read/write, addition and deletion of the contents are possible. The contents of the Message column 502, the beforeStat column 503, the afterStat column 504 and the existingCommand column 505 are uniquely specified for each content of the IP Address column 501. Stored in the IP address column 501 is the IP address of a device connected to the network 100. Stored in the Message column 502 is a message flowing through the network 100 currently monitored. Stored in the beforeStat column 503 and the afterStat column 504 is information indicating the status of a device connected to the network 100. The beforeStat column 503 indicates the status of the device (specified by IP Address) before a message described in the Message column 502 is transmitted, and the afterStat column 504 indicates the status of the device after the message is transmitted. Stored in the existingCommand column 505 is a command of the protocol preliminarily mounted on the device before product shipment of the device; the command corresponds to the content transmitted through the message shown in the Message column 502.

An illustrative example of the present embodiment will be described with reference to FIGS. 4 and 5. Reference numeral 510 of FIG. 5 indicates an entry of the protocol recording table 309 of the printer 103 which has an IP address of "192.168.0.11". Here, before receiving the message described in the column 502, the status of the printer 103 is "idle"; after receiving the message described in the column 502, the status is changed to "processing". Further, referring to the entry 510, stored in the existingCommand column 505 is a corresponding command "Print" for instructing the printer 103 to perform printing, because if the printer 103 in an idle state receives "Print" command, then the status of the printer 103 is changed from "idle" to "processing".

Further, reference numeral 511 of FIG. 5 indicates an entry of the protocol recording table 309 of the scanner 104 which has an IP address of "192.168.0.20". Here, before receiving the message described in the column 502, the status of the scanner 104 is "idle"; after receiving the message described in the column 502, the status is changed to "processing". Further, referring to the entry 511, stored in the existingCommand column 505 is a corresponding command "scan" for instructing the scanner 104 to scan, because if the scanner 104 in an idle state receives a "scan" command, then the status of the scanner 104 is changed from "idle" to "processing".

Further, reference numeral 512 of FIG. 5 indicates an entry of the protocol recording table 309 of a lighting device (not shown) which has an IP address of "192.168.0.12". Here, before receiving the message described in the column 502, the status of the lighting device is "off"; after receiving the message, the status is changed to "on". Further, referring to the entry 512, stored in the existingCommand column 505 is a corresponding command "lighton" for instructing the lighting device to turn on.

A processing flow in the communication system according to the present embodiment will be described with reference to FIG. 6.

Figure 6:
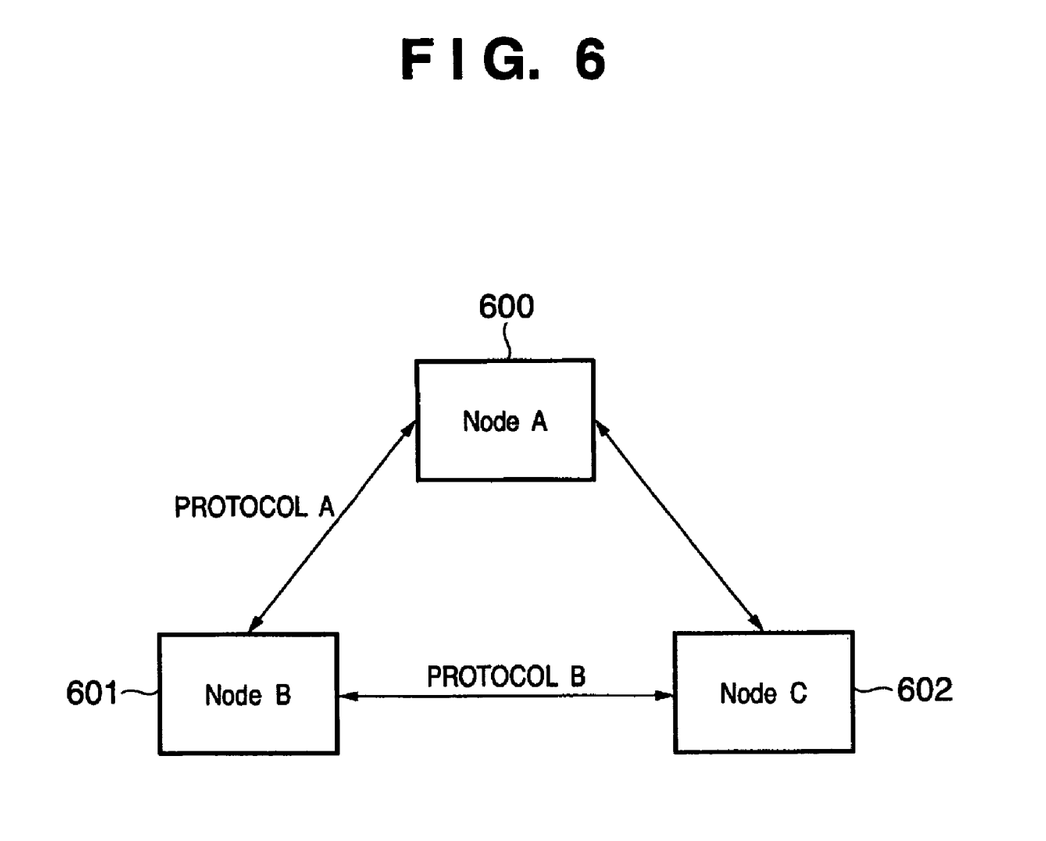
FIG. 6 is a conceptual diagram showing a configuration of the communication system according to the embodiment of the present invention.

FIG. 6 is a conceptual diagram showing a configuration of the communication system according to the embodiment of the present invention.

Referring to FIG. 6, NodeA 600, NodeB 601 and NodeC 602 each correspond to the digital camera 101, digital video camera 102, printer 103, scanner 104, projector 105, etc. of FIG. 1. However, the present invention is not limited to the above devices.

Here, assume that protocol UPnP being an existing protocol is mounted on NodeA 600 and NodeB 601, and that protocol XMLWebService being a new protocol is mounted on Node B601 and NodeC 602. However, the present invention is not limited to the above protocols.

Here, there will be described a processing flow when NodeA 600 and NodeB 601 use an existing protocol (protocol UPnP (hereinafter referred to as protocol A)), and NodeB 601 and NodeC 602 use a new protocol (protocol XMLWebService (hereinafter referred to as protocol B)). More specifically, there will be described a processing flow in which NodeA 600 learns the status of the communication through the protocol B between Node B601 and NodeC 602 so that NodeA 600 can use the protocol B.

The learning control module 304 of NodeA 600 instructs the protocol control module 302 of NodeA 600 to obtain the status of NodeB 601. In response to this instruction, the protocol control module 302 of NodeA 600 obtains the status of NodeB 601 through the protocol A. The learning control module 304 of NodeA 600 receives the status of NodeB 601 thus obtained as well as the IP address of NodeB 601, transfers them to the table reading/writing module 306 of NodeA 600 and instructs the protocol recording table 309 to hold them. The table reading/writing module 306 performs writing into IP Address column 501 and beforeStat column 503 of the protocol recording table 309 of NodeA 600.

An illustrative example will be described with reference to FIG. 5.

Here, a case where NodeB 601 is the printer 103 will be described. In the initial status, NodeB 601 is in the "idle" status before receiving a message. Consequently, the IP address of the printer 103 is written into the IP Address column 501 of the entry 510, and "idle" being the status before reception is recorded onto the beforeStat column 503.

Subsequently, the learning control module 304 of NodeA 600 instructs the protocol watch module 307 of NodeA 600 to watch and record a message flowing from NodeC 602 to the network 100. When some message is transmitted from NodeC 602 to NodeB 601, the protocol watch module 307 obtains and holds the message, and transfers it to the learning control module 304. After receiving this message, the learning control module 304 instructs the table reading/writing module 306 of NodeA 600 to perform writing. The table reading/writing module 306 writes the obtained message into the Message column 502 of the record having the IP address (message transmission destination address).

In the example of FIG. 5, the contents of the message are recorded onto the Message column 502 of record 510.

After instructing to write the message, the learning control module 304 of NodeA 600 instructs the protocol control module 302 of NodeA 600 to obtain the status of NodeB 601 similarly to the above. In response to this instruction, the protocol control module 302 obtains the status of NodeB 601 through the protocol A. The learning control module 304 of NodeA 600 receives the status of NodeB 601 thus obtained as well as the IP address of NodeB 601, transfers them to the table reading/writing module 306 of NodeA 600 and instructs the protocol recording table 309 of NodeA 600 to hold them, whereby the table reading/writing module 306 performs writing into the afterStat column 504 of the entry corresponding to the IP address in the IP Address column 501 of the protocol recording table 309 of NodeA 600.

In the example of FIG. 5, NodeA 600 recognizes that, after receiving from NodeC 602 the message shown in the Message column 502 of the entry 510 of FIG. 5, the status of NodeB 601 has been changed from "idle" to "processing". Thus, "processing" is stored in the afterStat column 504 of the entry 510.

In this manner, NodeA 600 repeats the above described operations of obtaining the status of NodeB 601, recording it onto the table 309, obtaining and recording a message transmitted from NodeC 602 to NodeB 601, and obtaining and recording the status of NodeB 601.

By repeating the above described operation, the learning control module 304 of NodeA uses the table reading/writing module 306 and thereby reads data recorded on the protocol recording table 309 of NodeA 600. Based on the data thus read, the status of NodeB 601 before receiving a message from NodeC 602 is compared with the status of NodeB 601 after receiving the message. Then, one command allowing such status change to occur is selected from among the commands of the protocol A (existing protocol) which NodeA 600 has, and written into the existingCommand column 505 of the protocol recording table 309 by the table reading/writing module 306.

In the example of FIG. 5, recorded on the existingCommand column 505 of the entry 510 is "print" which is a command, allowing the printer 103 to be changed from "idle" status to "processing", and shared by the protocol A.

In this manner, the learning control module 304 of NodeA 600 uses the table reading/writing module 306 and thereby records the IP address of NodeB 601. Further, the learning control module 304 of NodeA 600 records the IP address onto the IP Address column 401 of the command table 308 shown in FIG. 4, and "True" (indicating that the protocol A (existing protocol) is mounted) onto the Existing column 402. Further, the learning control module 304 of NodeA 600 records the IP address of NodeC 602 onto the IP Address column 401 of the command table 308, and "false" (indicating that the protocol A is not mounted) onto the Existing column 402.

With respect to the other devices, NodeA 600 similarly creates data for the protocol recording table 309 and the command table 308 by a procedure similar to the above described one, and associates them with the IP addresses of each device and records them onto the respective entries of the table.

When a request is accepted from the applications mounted on the digital camera 101, projector 102 and the like, NodeA 600 obtains a destination IP address of a message. Then, the table reading/writing module 306 is used to obtain the content of the Existing column 402 from an entry having the same value in the IP address column 401 of the command table 308. If the content of the Existing column 402 is "True", it is determined that the existing protocol A is to be used, and the protocol control module 302 is activated; if the content of the Existing column 402 is "false", it is determined that the protocol B (new protocol) is to be used, and the command is transferred to the learning control module 304. In this manner, the content of the Existing column 402, "True" and "false" are used to determine whether the protocol A or B is used.

After receiving the command and the IP address, the learning control module 304 uses the table reading/writing module 306 to access the protocol recording table 309. Then, the learning control module 304 further derives a command recorded on the existingCommand column 505 from an entry having the same IP address in the IP Address column 501, and also obtains a message from the Message column 502 of the entry and transfers the message and the command to the virtual protocol module 305, whereby the virtual protocol module 305 of NodeA 600 replaces the command "Print" of the protocol A with the message of the Message column 502 and transmits the message to, for example, NodeC 602 through a virtual protocol B.

Thus, based on information obtained from NodeB 601 while NodeB 601 communicates with NodeC 602, NodeA 600 obtains the command (command of the virtual protocol B) of the protocol B used between NodeB 601 and NodeC 602. Accordingly, NodeA 600 can communicate with NodeC 602 through the virtual protocol B.

In the above explanation, the case of the entry 510 of FIG. 5 is described. However, it is also possible to similarly create data in the cases of the entries record 511 and 512.

The communication processing in the above described Nodes A to C will be described with reference to a flowchart shown in FIG. 7.

Figure 7:
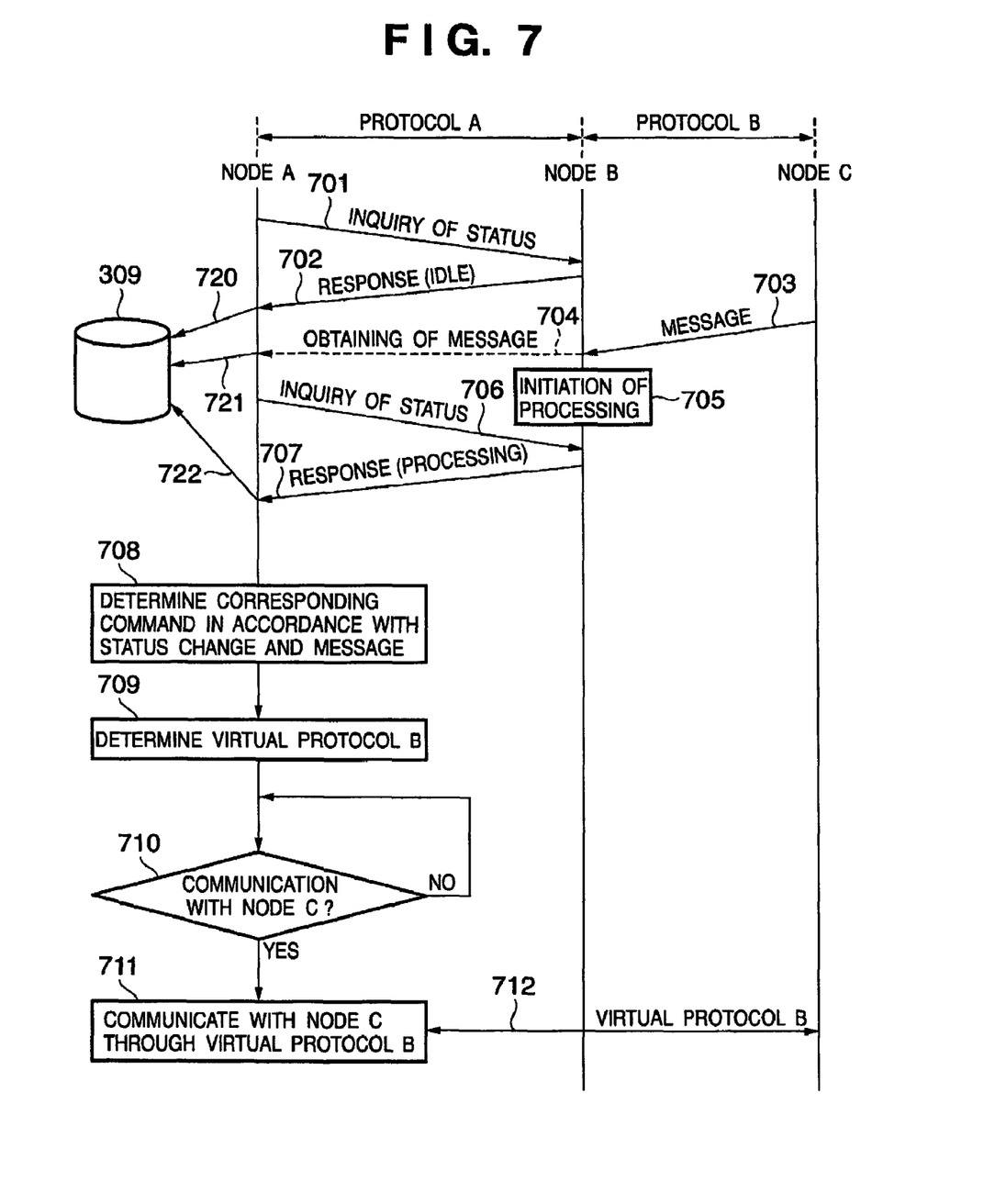
FIG. 7 depicts a view for explaining a data flow and a processing flow in the communication system (FIG. 6) according to the embodiment of the present invention.

FIG. 7 depicts a view for explaining a data flow and a processing flow in the communication system (FIG. 6) according to the embodiment of the present invention.

In NodeA 600, the learning control module 304 instructs the protocol control module 302 to obtain the status of NodeB 601. In response to this instruction, the protocol control module 302 inquires (701) from NodeB 601 its status through the protocol A. At step 702, the protocol control module 302 receives a status (in this case, "idle") sent back from NodeB 601 and obtains the status of NodeB 601. More specifically, by communicating through the protocol A (first protocol) with NodeB 601 (first device) connected via the network 100, the protocol control module 302 of NodeA 600 obtains the status of NodeB 601. The status of NodeB 601 thus obtained is recorded (720) onto an entry corresponding to the IP address of NodeB 601 of the protocol recording table 309. Here, the IP address of NodeB 601 is recorded onto the IP Address column 501 of the protocol recording table 309, and the obtained status onto the beforeStat column 503.

The message flowing from NodeC 602 to the network 100 is placed under observation; when some message 703 is transmitted from NodeC 602 to NodeB 601, NodeB 601 initiates a processing 705 corresponding to the message 703. The protocol watch module 307 of NodeA 600 obtains (704) the message 703 transmitted from NodeC 602 to NodeB 601 and transfers it to the learning control module 304. More specifically, the protocol watch module 307 of NodeA 600 obtains the message 703 transmitted through the protocol B (second protocol) between NodeB 601 and NodeC 602 (second device) connected via the network 100. Thus, the obtained message 703 is written (721) into the Message column 502 of the protocol recording table 309 of the entry 510 having the IP address of NodeB 601.

Subsequently, in step 706, NodeA 600 instructs NodeB 601 to obtain the status of NodeB 601. At this status, NodeB 601 has already initiated its processing 705, so its status has been changed from "idle" to "processing". In this manner, NodeA 600 obtains (707) the status of NodeB 601 through the protocol A. More specifically, by communicating through the protocol A (first protocol) with NodeB 601 (first device) connected via the network 100, the protocol control module 302 of NodeA 600 obtains the status of NodeB 601. Here, the status of NodeB 601 thus obtained is received together with the IP address of NodeB 601, transferred to the table reading/writing module 306 and recorded (722) onto the protocol recording table 309. In a case that the above described processing is performed with respect to NodeB 601 or another Node, a plurality of received messages and status changes of Node caused by the messages are associated with the IP addresses of each Node and recorded onto the protocol recording table 309.

Subsequently, in step 708, the learning control module 304 of NodeA 600 uses the table reading/writing module 306 to read data recorded on the protocol recording table 309. Based on the data thus read, the status of NodeB 601 before receiving a message from NodeC 602 is compared with the status of NodeB 601 after receiving the message. Then, a command allowing such status change to occur is selected from among the commands of the protocol A which NodeA 600 has, and written into existingCommand column 505 of the protocol recording table 309 by the table reading/writing module 306.

For example, in a case where NodeB 601 is a printer, when a command "Print" is received, the status of the printer is changed from "idle" to "processing". Accordingly, in the example of FIG. 5, recorded on the existingCommand column 505 of the entry 510 is the corresponding command "Print" of the protocol A. Consequently, "false" is recorded onto the Existing column 402 of the command table 308 corresponding to NodeC 602. More specifically, based on the status changes of NodeB 601 obtained before and after receiving the message 703, the message 703 is associated with a command (in this case, "Print") of the protocol A (first protocol).

Subsequently, in step 709, the virtual protocol module 305 creates a virtual protocol B by replacing, for example, a command "Print" of the protocol A with the message of the Message column 502. Subsequently, in step 710, it is determined whether or not it is instructed to communicate with NodeC 602. If so, the flow proceeds to step 711 to confirm the contents of the Existing column 402 corresponding to the IP address of NodeC 602 recorded on the command table 308. Here, the recorded data is "false", so communication is performed with NodeC 602 according to the virtual protocol B (712) created in step 709. Specifically, for example, in a case where NodeC is a scanner, if it is desired that an image is scanned by the scanner, the message of the Message column 502 corresponding to existingCommand "scan" recorded on the entry 511 of FIG. 5 is transmitted. More specifically, based on the status changes of NodeB 601 obtained before and after receiving the message 703, the virtual protocol module 305 of NodeA 600 creates a command of the protocol B and transmits the command to NodeC 602. To be more in detail, a corresponding command of the protocol B is created based on the associated command (for example, "scan") of the protocol A and the message, and transmitted to NodeC 602.

In the configuration of FIG. 6, Nodes A to C may be any device. Particularly, by learning protocols used when images are transferred between each Node, effective utilization is possible in all Nodes (devices) handling images (file or the like). For example, in a case that a printer receives image data, this means printing, and in the case of a camera, the image data is stored therein.

Figure 8:
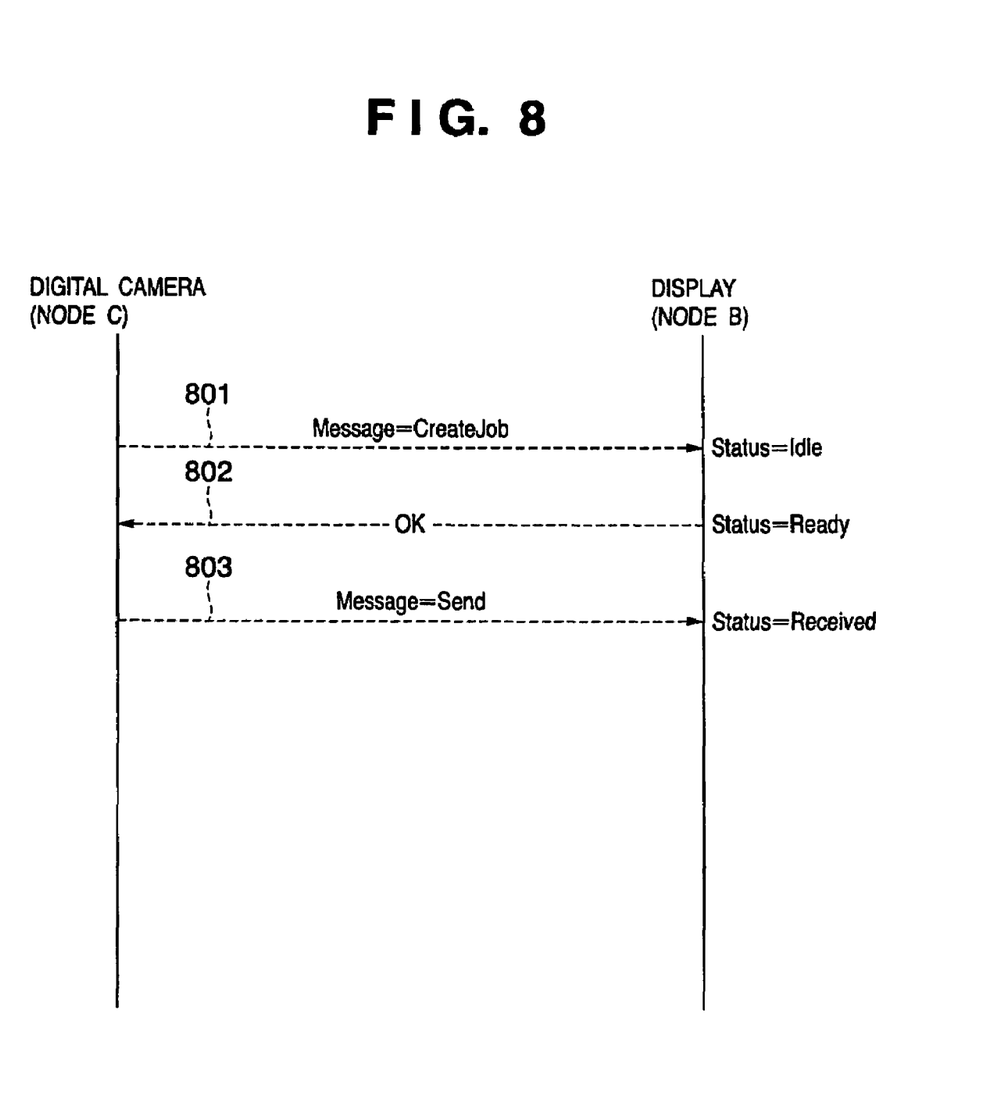
FIG. 8 depicts a view for explaining an image data transfer sequence (protocol B) between a display (display unit) (node B) and a digital camera (node C).

FIG. 8 depicts a view for explaining an image data transfer sequence (protocol B) between a display (display unit) (node B) and a digital camera (node C). In this case, also, it is intended that NodeA has the protocol A and monitors the status of NodeB to perform communication through the protocol B.

Assume that, before step 801, NodeA has recognized that NodeB is in the "idle" status. The status can be obtained from NodeB 601, similarly to steps 701 and 702 of FIG. 7, through the protocol A. Subsequently, in step 801, a message (CreateJob) indicating that there exists a job is sent from NodeC. At the time when a response "OK" is made to the request (802), the status of NodeB is changed from "idle" to "ready". NodeA 600 obtains the message (CreateJob) transmitted through the protocol B between NodeB 601 and NodeC 602. NodeA 600 obtains the status "ready" of NodeB 601 from NodeB 601 through the protocol A.

Subsequently, in step 803, data (message (Send)) to be displayed is transmitted from NodeC to NodeB. Thus, the status of NodeB shifts from "ready" to a mode "Received" (initiation of display) indicating that data has been received. NodeA 600 obtains the message (Send) transmitted through the protocol B between NodeB 601 and NodeC 602. NodeA 600 obtains the status "Received" (initiation of display) of NodeB 601 from NodeB 601 through the protocol A.

After obtaining these pieces of information and storing them in the protocol recording table 309, NodeA determines a command of the protocol A corresponding to the command (801) allowing the status of the display (NodeB) to shift from "idle" to "ready". Further, NodeA determines a command of the protocol A corresponding to the command (803) allowing the status of the display (NodeB) to shift from "ready" to "Received". These commands are used to create the virtual protocol B, whereby communication between NodeA and NodeC (digital camera) becomes possible. More specifically, based on the status change of NodeB, NodeA can know the commands (CreateJob, Send) used to transmit data through the protocol B.

To transfer image data from NodeA to NodeC (digital camera), firstly, a message corresponding to "CreateJob" of the protocol B is transmitted to NodeC (camera). At the time when a response "OK" is made to the message, the status of NodeC (digital camera) shifts from "idle" to "ready".

Subsequently, a message corresponding to "Send" of the protocol B, having attached thereto data (image) to be saved, is transmitted from NodeA to NodeC. Thus, the status of NodeC shifts from "ready" to a mode "Received" (initiation of image save) indicating that data has been received. More specifically, upon transmitting data to NodeC through the protocol B, NodeA creates a command for transmitting data, of the protocol B and learnt based on the status change of NodeB, and transmits it to NodeC.

As described above, the communication between NodeA and NodeC becomes possible through the virtual protocol B preliminarily created.

It should be noted that the present invention includes a case where a software program implementing the function of the above described embodiment is directly or remotely supplied to a system or an apparatus and the computer of the system or apparatus reads and executes the program code thus supplied, whereby the above function is achieved. In this case, the program function need not to have a configuration of program. Accordingly, a program code itself installed in a computer in order to implement the function processing of the present invention in the computer also implements the present invention. In other words, the present invention includes the computer program itself for implementing the function processing of the present invention as well. In this case, the program function can have any program configuration, such as an object code, a program executed by an interpreter, or script data supplied to an operating system.

Examples of storage media used for supplying the program are a floppy (registered mark) disk, a hard disk, an optical disk, a magneto optical disk, a CD-ROM, a nonvolatile memory card, a ROM and a DVD. The program can also be supplied by creating a connection with a website on the Internet by use of a client computer browser and thereby downloading from the website to a storage medium, such as a hard disk, the computer program itself of the present invention or a file containing a compressed automatic install function. The present invention can also be implemented by dividing the program code constituting the program of the present invention into a plurality of files and downloading each file from different websites. In other words, a WWW server allowing the program file for implementing the function processing of the present invention in a computer to be downloaded to a plurality of users is also included in the claims of the present invention.

Further, the present invention can also be implemented by encrypting the program of the present invention, storing it in a storage medium, such as CD-ROM, distributing the storage medium to users, allowing users who meet predetermined requirements to download decryption key information from a website via the Internet, and allowing these users to decrypt the encrypted program by using the key information, whereby the program is installed in the user computer.

Besides the cases where the function according to the above described embodiment is implemented by executing the read program by computer, an operating system or the like running on the computer based on the instruction of the program may perform part of or all of the actual processing so that the function of the above described embodiment can be implemented by this processing.

Further, after the program read from the storage medium is written to a function expansion board inserted into the computer or to a memory provided in a function expansion unit connected to the computer, a CPU or the like mounted on the function expansion board or function expansion unit performs all or a part of the actual processing based on the instruction of the program so that the function of the above described embodiment can be implemented by this processing.

The present invention is not limited to the above embodiments and various changes and modifications can be made within the spirit and scope of the present invention. Therefore, to appraise the public of the scope of the present invention, the following claims are made.

This application claims the benefit of Japanese Patent Application No. 2005-176891, filed on Jun. 16, 2005, which is hereby incorporated by reference herein in its entirety.

What is claimed is:

1. A communication apparatus, comprising:
    an obtaining unit configured to obtain a first status and a second status of a first device through a first protocol, wherein the first device is connected to the communication apparatus via a network;
    a reception unit configured to receive a message of a second protocol that is transmitted from a second device to the first device via the network;
    a storage unit configured to store the message of the second protocol received by said reception unit, the first status of the first device obtained by said obtaining unit before said reception unit receives the message of the second protocol, and the second status of the first device obtained by said obtaining unit after said reception unit receives the message of the second protocol;
    a creation unit configured to create a command for changing a status of the second device from a status corresponding to the first status to a status corresponding to the second status, based on the message of the second protocol stored by said storage unit; and
    a transmission unit configured to transmit the command created by said creation unit to the second device.

2. An apparatus according to claim 1, wherein said storage unit stores data indicating the first status and the second status of the first device obtained by said obtaining unit and the message received by said reception unit, wherein the data and the message are associated with an address of the first device.

3. An apparatus according to claim 1, further comprising a unit configured to store information indicating whether communication through the first protocol is possible, wherein the information is associated with each address of the devices connected to the network.

4. An apparatus according to claim 1, further comprising an association unit configured to associate the message of the second protocol stored by said storing unit with the command created by said creation unit, based on a start time when said reception unit started to receive the message and an end time when said reception unit finished receiving the message.

5. A command transmission method performed by a communication apparatus, the method comprising:
    an obtaining step of obtaining through a first protocol a first status and a second status of a first device connected to the communication apparatus via a network;
    a reception step of receiving a message of a second protocol that is transmitted from a second device to the first device via the network;
    a storage step of storing the message of the second protocol received in said reception step, the first status of the first device obtained in said obtaining step before the message of the second protocol is received in said reception step, and the second status of the first device obtained in said obtaining step after the message of the second protocol is received in said reception step;
    a creation step of creating a command for changing a status of the second device from a status corresponding to the first status to a status corresponding to the second status, based on the message of the second protocol stored in said storage step; and
    a transmission step of transmitting the command created in said creation step to the second device.

6. The method according to claim 5, wherein said storage step stores data indicating the first status and the second status of the first device obtained in said obtaining step and the message received in said reception step, wherein the data and the message are associated with an address of the first device.

7. The method according to claim 5, further comprising a step of storing information indicating whether communication through the first protocol is possible, wherein the information is associated with each address of the devices connected to the network.

8. A computer-readable storage medium storing a computer-executable command transmission program, when executed by a computer, the program comprising:

an obtaining module of obtaining through a first protocol a first status and a second status of a first device connected to the communication apparatus via a network;

a reception module of receiving a message of a second protocol that is transmitted from a second device to the first device via the network;

a storage module of storing the message of the second protocol received by said reception module, the first status of the first device obtained by said obtaining module before said reception module receives the message of the second protocol and the second status of the first device obtained by said obtaining module after said reception module receives the message of the second protocol;

a creation module of creating to the first status to a status corresponding to the second status, based on the message of the second protocol stored by said storage module; and a transmission module of transmitting the command created in said creation module to the second device.

* * * * *